United States Patent [19]

Picard et al.

[11] Patent Number: 5,452,423
[45] Date of Patent: Sep. 19, 1995

[54] TWO-ROM MULTIBYTE MICROCODE ADDRESS SELECTION METHOD AND APPARATUS

[75] Inventors: James A. Picard, San Jose; Morris E. Jones, Jr., Saratoga, both of Calif.

[73] Assignee: Chips and Technologies, Inc., San Jose, Calif.

[21] Appl. No.: 714,961

[22] Filed: Jun. 13, 1991

[51] Int. Cl.⁶ .................................................. G06F 9/30
[52] U.S. Cl. .............................. 395/375; 364/DIG. 1; 364/DIG. 2; 364/259.9; 364/244.6; 364/262.81; 395/421.02
[58] Field of Search ... 364/200 MS File, 900 MS File; 395/375, 425, 400

[56] References Cited

U.S. PATENT DOCUMENTS

| | | | |
|---|---|---|---|
| 4,309,753 | 1/1982 | Negi et al. | 395/375 |
| 4,323,964 | 4/1982 | Gruner | 395/375 |
| 4,538,223 | 8/1985 | Vahlstrom et al. | 395/400 |
| 4,825,363 | 4/1989 | Baumann et al. | 395/375 |
| 4,847,759 | 7/1989 | Oklobdzija | 395/425 |
| 4,980,853 | 12/1990 | Hutchins | 395/425 |
| 5,023,828 | 6/1991 | Grundmann et al. | 395/375 |
| 5,070,451 | 12/1991 | Moore et al. | 395/375 |
| 5,233,696 | 8/1993 | Suzuki | 395/375 |

OTHER PUBLICATIONS

Mano, Computer System Architecture, 2nd Ed., 1982, pp. 69–71.

Primary Examiner—Rebecca L. Rudolph
Assistant Examiner—Matthew M. Kim
Attorney, Agent, or Firm—Townsend and Townsend and Crew

[57] ABSTRACT

An efficient organization for microcoded instruction sets which have processor operations in which not all the bits of an instruction word are required. The organization has two registers for receiving and holding the first and second byte of instructions at a time, a first ROM connected to the register for decoding the first byte into control signals for operation of said microprocessor. One of these control signals is generated whenever the portion of the second instruction byte is required. The organization also has a second ROM connected to the register for decoding the portion of the second byte into control signals. Connected to said first and second ROMs is a multiplexer which selects the decoded second byte control signals for operation of the microprocessor responsive to the first ROM control signal. The combined size of the first and second ROMs is much smaller compared to that of a ROM which decodes both bytes all the time and achieves a great savings in the space occupied by the processor integrated circuit.

11 Claims, 2 Drawing Sheets

TWO-ROM MULTIBYTE MICROCODE ADDRESS SELECTION METHOD AND APPARATUS

BACKGROUND OF THE INVENTION

The present invention relates to processors with microcoded instruction sets and, more particularly, to instruction sets which provide for processor operations in which not all the bits of an instruction word are required.

In the organization of a typical computer processor, as shown in FIG. 1, the instructions which are to be executed are stored in a memory block 10. In such an organization, the instruction signals address the locations in a ROM which contains microinstruction signals which are the basis for the control signals in the processor. Thus the processor has a ROM-address register block 17 as shown in FIG. 1. A micro-address register 13 holds the address of a memory location in the ROM 15. The register 13 is connected to the output terminals of a multiplexer 12, which selects address signals from an instruction register block 11 and an incrementor 14. The incrementor 14 increments the address held in the register 13 for sequential addressing of the microinstructions in the ROM.

Fed by the memory block 10, the instruction register block 11 holds instructions which are to be executed or immediate data (or address) and control signals which are to be sent directly to a control decode block 16. The control decode block 16 receives the microinstruction signals from the ROM 15 or direct signals from the instruction register block 11 to generate and time the control signals for the processor.

However, most processors have sets of instructions of varying length and not all the bits in an instruction word are required for an operation. For example, in instruction sets having one-byte instructions with instruction words of two or more bytes, the second byte in the instruction word may not be needed for the execution of the first byte. This implies that much of the address space of the ROM 15 is wasted because the second byte of the instruction word in the register 13 is not required to address the selected microinstruction.

In many systems, as in computer mainframes, the waste of ROM space is not significant. However, in microprocessors the contrary may be true. Such a ROM can occupy a significant fraction of the surface area of the microprocessor semiconductor chip. A reduction in size of the ROM, and hence the overall chip, is desirable for various reasons. A smaller chip decreases the chances of defects in an individual chip during the manufacturing process. Costs are lowered. The units in the microprocessor are packed closer in a smaller chip and operating speeds are increased. Finally, the smaller chip follows the trend in microprocessor-based technology. Increased miniaturization results in lighter, smaller and more convenient computers.

The present invention is thus directed towards a more efficient implementation of an instruction set in which not all the bits in an instruction word are required to carry out an operation.

SUMMARY OF THE INVENTION

In the case of a microprocessor processing instruction words of at least first and second bytes, the instruction words formed from a set of instructions which provide for operations in which a portion of the second byte may be required, the present invention provides for the microprocessor having registers for receiving and holding the first and second byte of instructions at a time, a first ROM connected to the register for decoding the first byte into control signals for operation of said microprocessor. One of these control signals is generated whenever the portion of the second instruction byte is required.

The microprocessor also has a second ROM connected to the register for decoding the portion of the second byte into control signals. Connected to said first and second ROMs is a multiplexer which selects the decoded second byte control signals for operation of the microprocessor responsive to the first ROM control signal.

In this manner the combined size of the first and second ROMs is much smaller compared to that of a ROM which decodes both bytes all the time.

BRIEF DESCRIPTION OF THE DRAWINGS

A clear understanding of the present invention may be achieved by a perusal of the following Detailed Description of Specific Embodiment(s) with reference to the following drawings.

DETAILED DESCRIPTION OF SPECIFIC EMBODIMENTS

An example of an instruction set which provides for processor operations in which not all the bits of an instruction word are required is the instruction set for the 8088/8086 microprocessors originally sold by Intel Corporation of Santa Clara, California. A word, both data and instruction, for these related microprocessors is 16 bits wide, a concatenation of two bytes. On the other hand, the complete instruction itself can be one to seven bytes long.

Generally speaking, the first byte specifies the microprocessor's operation. Bytes two to seven are used to specify addresses when required. To handle a large range of addresses, the 8088/8086 instruction set has a "mod r/m" (or "mode register/modifier") byte. This byte specifies how the addresses are to be treated and appears as the second byte in an instruction word.

However, unless the mod r/m byte appears, there is no need to decode the second byte. Hence the capacity of a large microcoded ROM, which decodes the instruction word into microinstruction control signals to carry out the operation specified in the microprocessor, sometimes is not used.

Figure 2:
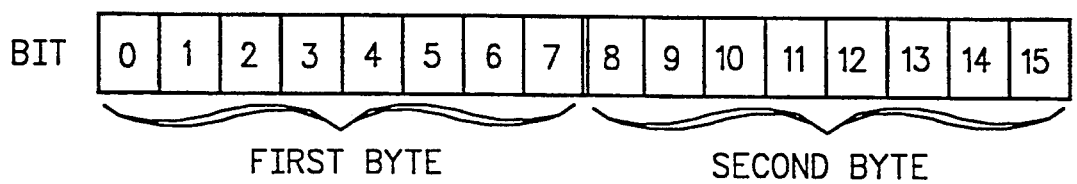
FIG. 2 is a representational view of an instruction word.

FIG. 2 represents an instruction word of an 8088/8086 microprocessor. The set of bits 0–7 form the first byte of instruction; bits 8–15 form the second byte. The first byte of the instruction typically carries the operation code for an instruction. The second byte of instruction may carry some operation code. However, except when the second byte is used to specify the addressing mode of the addresses in the bytes to follow, i.e., the second byte is a mod r/m byte, the bits of the second byte are not utilized in address determination.

For the mod r/m byte, bits 8 and 9 specify the addressing mode. Bits 13–15 specify the part of the memory which the following bits address. The bits 13–15 act as tag bits to the following address bits. When part of a mod r/m byte, the middle bits 10-12 address particular registers in the microprocessor. When not part of a mod r/m byte, the middle bits 10-12 help to completely specify the operation denoted by the first instruction byte.

Figure 1:
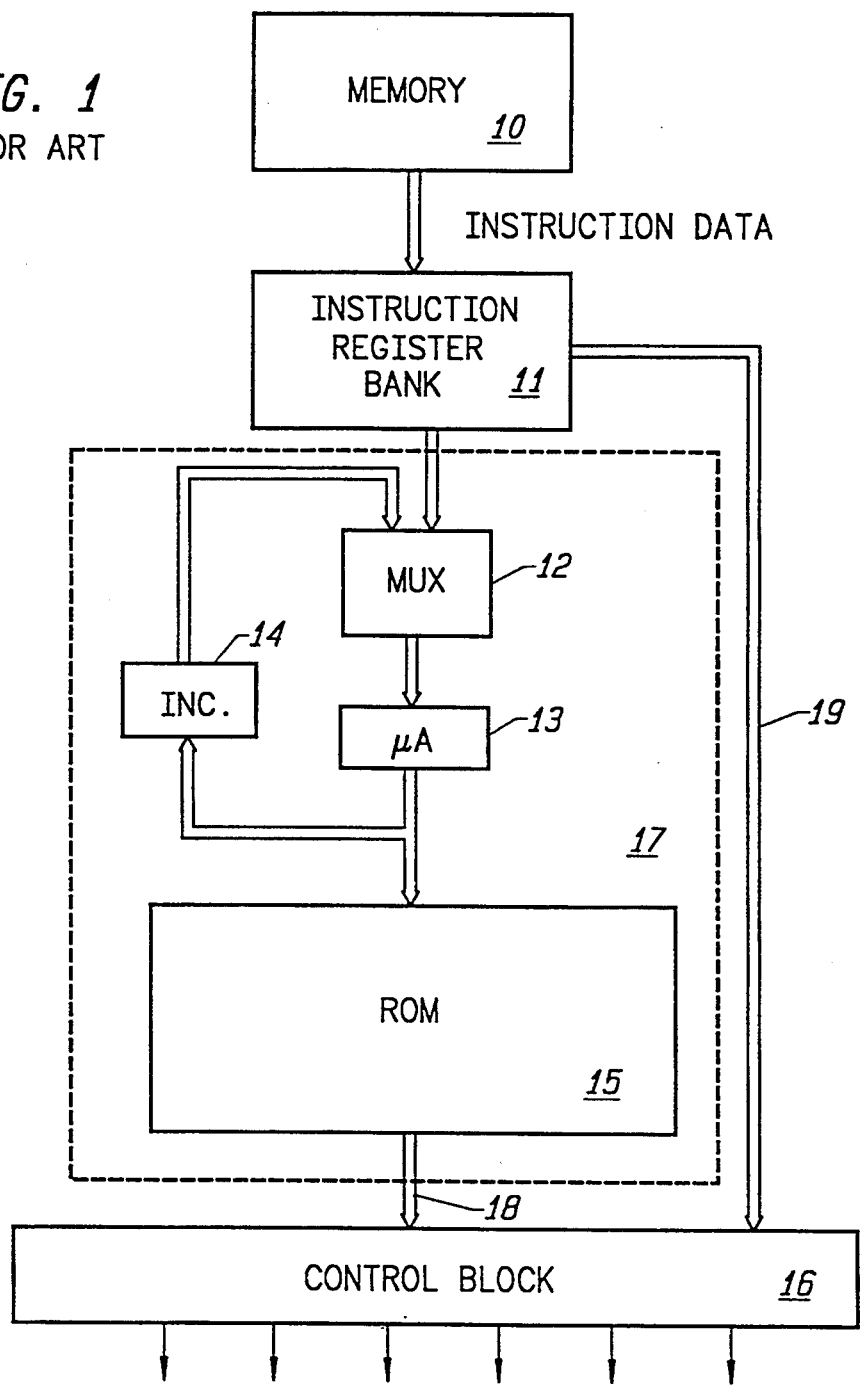
FIG. 1 is functional block diagram of a typical computer processor system which uses microcoded instruction sets.

These middle bits of the second byte of instruction do not need to be implemented by microinstructions. Hence these bit signals may bypass the microcoded ROM which nominally receives an instruction word to address the microinstructions to implement the operation called for by the instruction word. In the present invention these middle bits go directly to the control decode block of the microprocessor. As represented in FIG. 1, these middle bits travel on the signal path 19.

Thus all the bits of the first byte, and bits 8-9 and bits 13-15 of the second byte, thirteen bits in all, may address the microcoded ROM. If the ROM is implemented in typical fashion, a ROM of $2^{13}$ or 8192 address locations, is required to handle all the possible addresses of the instruction word.

The present invention notes that not all these address locations are required. Unless the second byte is a mod r/m byte, bits 8-9 and 13-15 of that byte are not required. The present invention also notes the described instruction set has a consistent bit field in the instruction words during operations requiring address specification. The first byte of instruction words continues to specify the operation to be performed even though the particular bits in the mod r/m and subsequent bytes vary. This consistency of the operation code field allows the instruction word to be split as described below to achieve the benefits of the present invention.

Figure 3:
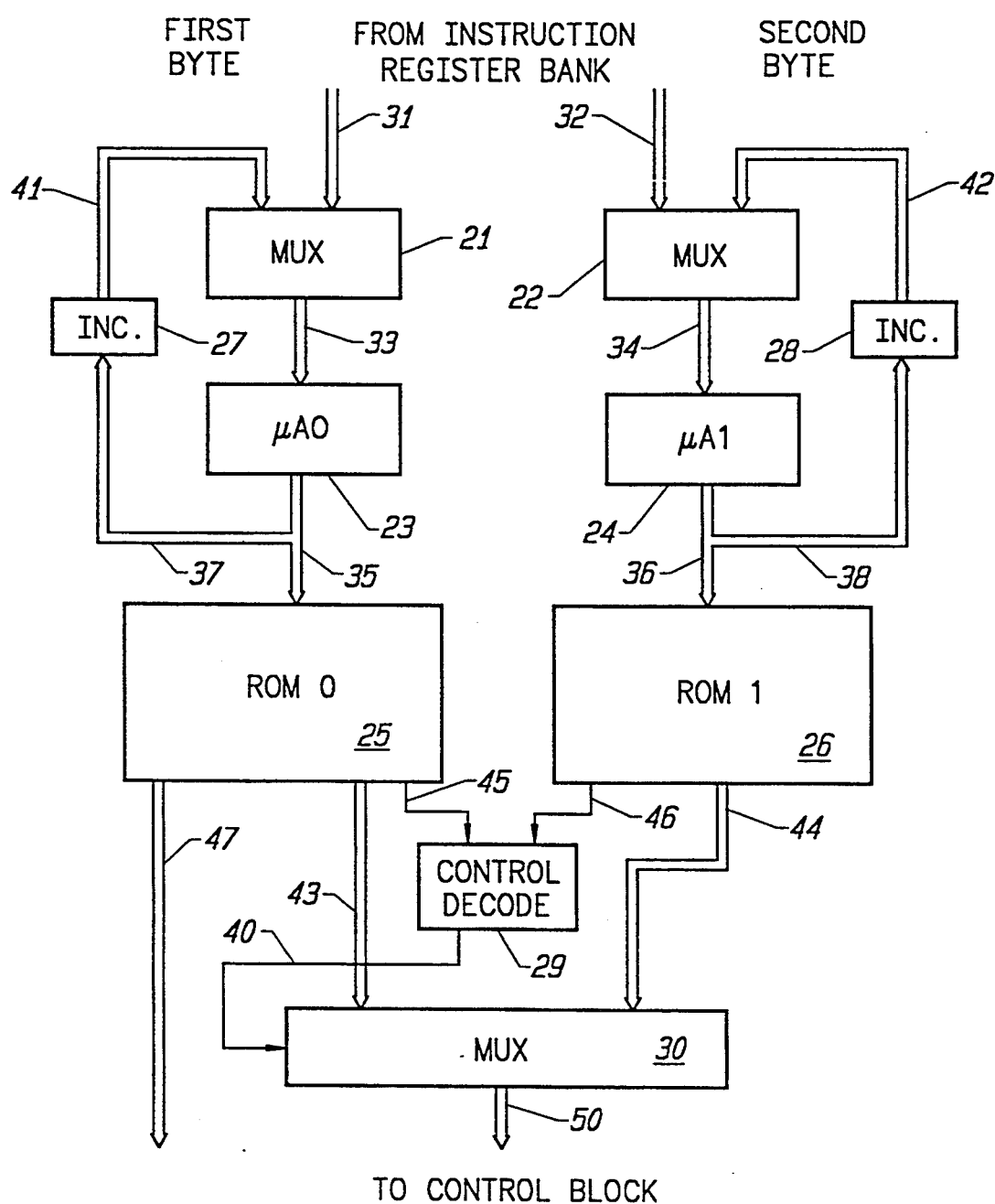
FIG. 3 is a block diagram of the present invention.

The present invention replaces the ROM-address register block 17 in a typical processor organization as shown in FIG. 1 and splits the instruction word signal path as shown in FIG. 3. Two signal paths are respectively provided for the first and second bytes of an instruction word. From the instruction register bank 11 in FIG. 1, the first byte travels on signal path 31 to a multiplexer 21. By a signal path 33 the multiplexer 21 feeds an address register 23 which receives and holds the first byte of an instruction word. The first byte in the register 23 by an output signal path 35 addresses a ROM 25 which holds the various microinstruction control signals.

As in the case of a conventionally organized processor, an incrementor 27 is connected to the output signal path 35 from the register 23 and feeds an incremented address back to the multiplexer 21 on a path 41. Responsive to control signals, the multiplexer 21 selects the incremented addresses for instructions requiring a string of microinstructions for execution before selecting the next instruction byte on the path 31.

In a similar manner, the second byte of the instruction word travels on a signal path 32 to a multiplexer 22, which feeds an address register 24 by a path 34. The second byte addresses a ROM 26 which holds the microinstruction control signals at the locations addressed by the second byte on a path 36. For sequential microinstruction operations, an incrementor 28 receives the second byte addresses by a path 38 and feeds the incremented addresses back on a path 42 to the multiplexer 22.

The microinstruction control signals from the ROM 25 addressed by the first byte is split into two signal paths 47 and 43. The signal path 47 goes directly to the control block 16 of FIG. 1. This path carries signals which are always used by the microprocessor. The signal path 43, on the other hand, leads to one set of input terminals of a multiplexer 30, which has its output terminals connected to the control block 16 by a signal path 50.

The microinstruction control signals from the ROM 26 travel on a path 44 to a second set of input terminals of the multiplexer 30. The selection of which set of input terminals to connect to the signal path 50 is determined by a control signal on a line 40 from a control decode block 29. The block 29 is connected to an output line 45 from the ROM 25 and an output line 46 from the ROM 26. The block 29 generates the control signal on the line 40 to select which signals on the paths 43 and 44 are to be sent to the control and decode block 16.

In operation, the block 29 nominally generates a signal so that the microinstruction control signals from the ROM 25 are sent to the block 16. When the first byte in the instruction word is followed by a mod r/m byte, the first byte generates a signal on the line 45 through the ROM 25 to select the signals on the path 44, rather than on the path 43. The signals on the path 44 prepares the control decode block 16 to receive the addresses in the bytes to follow. After the address bytes have been passed to the control and decode block 16 (on the bypass signal path 19 shown in FIG. 1), the mod r/m byte signals through the line 46 that the flow of microinstruction control signals from the ROM 25 should be resumed. The next instruction word is then passed into the address registers 23 and 24.

For the particular embodiment described with respect to the 8088/8086 instruction set, this arrangement results in ROMs of only ($2^8 = 256$ plus $2^5 = 64$) 320 address locations. This number, compared to 8192, illustrates the savings in ROM area which is achieved through the present invention.

It should be noted that the present invention is applicable beyond the 8088/8086 instruction set. When all the bits of an instruction word are not required to carry out an operation in a microprocessor, the present invention may used to achieve a more efficient implementation.

Thus, while the description above provides a full and complete disclosure of the preferred embodiments of the present invention, various modifications, alternate constructions and equivalents may be employed without departing from the true scope and spirit of the invention. Therefore, the present invention should be limited only by the metes and bounds of the appended claims.

What is claimed is:

1. A microprocessor for processing instruction words of at least first and .second bytes, said instruction words formed from a set of instructions, said instruction set providing for operations in which a portion of said second byte is not required, said microprocessor comprising:

means for receiving and holding said first byte of said instruction words;

means for receiving and holding said second byte of said instruction words;

a first ROM connected to said first byte receiving and holding means for decoding said first byte into control signals for operation of said microprocessor, said control signals including a first ROM control signal that is generated whenever said portion of said second byte of said instruction words is required;

a second ROM connected to said second byte receiving and holding means for decoding said portion of said second byte into control signals; and a multiplexer connected to said first and second ROMs for receiving said decoded control signals from said first and second ROMs, said multiplexer selecting said decoded control signals from said second ROM in response to said first ROM control signal for operation of said microprocessor;

wherein said second ROM generates a second ROM control signal whenever said second byte portion is no longer required for operation of said microprocessor, said multiplexer selecting said decoded signals from said first ROM in response to said second ROM control signal.

2. The microprocessor as in claim 1 wherein said first instruction byte comprises operation code bits and said second instruction byte portion comprises address mode bits when said first ROM control signal is generated.

3. The microprocessor as in claim 2 further comprising a control decode block responsive to said first and second ROM control signals for generating a selection control signal to said multiplexer for selection of one of said first or second ROM decoded signals.

4. The microprocessor as in claim 3 wherein said first and second ROMS have output terminals for said first and second ROM control signals, said multiplexer has input terminals and output terminals and a control terminal, said multiplexer input terminals connected to said first and said second ROM output terminals, and said multiplexer control terminal connected to said control decode block.

5. The microprocessor as in claim 4 wherein at least one bit of said second byte of instruction word by-passes said second ROM.

6. The microprocessor as in claim 5 wherein said by-pass bits comprise register addresses when said first ROM control signal is generated.

7. The microprocessor as in claim 5 wherein said by-pass bits number three.

8. In a microprocessor of a type which decodes instruction words having at least first and second bytes, wherein the first and second bytes are ordinarily combined together to form a ROM address for addressing a ROM which decodes the instruction words, the instruction words being formed from a set of instructions which provide for operations wherein a portion of the second byte need not be decoded by the ROM, an apparatus for decoding the instruction words comprising:

first receiving means for receiving the first byte of the instruction words;

second receiving means for receiving the second byte of the instruction words;

a first ROM coupled to the first receiving means and being addressed by the first byte for decoding the first byte into control signals, the control signals including a first ROM control signal that is generated whenever the portion of the second byte of the instruction words needs to be decoded;

a second ROM coupled to the second byte receiving means and being independently addressed by the second byte for decoding the second byte into control signals;

a multiplexer coupled to the first and second ROMs for receiving the control signals from the first and second ROMs, wherein the multiplexer selects the decoded control signals from the second ROM in response to the first ROM control signal;

wherein the second ROM generates a second ROM control signal whenever the second byte no longer needs to be decoded, and wherein the multiplexer selects the decoded signals from the first ROM in response to the second ROM signal; and a control decode circuit coupled for receiving the first and second ROM control signals for generating a selection control signal to the multiplexer for selection of one of the first or second ROM decoded signals.

9. In a microprocessor of a type which decodes instruction words having at least first and second bytes, wherein the first and second bytes are ordinarily combined together to form a ROM address for addressing a ROM which decodes the instruction words, the instruction words being formed from a set of instructions which provide for operations wherein a portion of the second byte need not be decoded by the ROM, an apparatus for decoding the instruction words comprising:

first receiving means for receiving the first byte of the instruction Words;

second receiving means for receiving the second byte of the instruction words;

a first ROM coupled to the first receiving means and being addressed by the first byte for decoding the first byte into control signals, the control signals including a first ROM control signal that is generated whenever the portion of the second byte of the instruction words needs to be decoded;

a second ROM coupled to the second byte receiving means and being independently addressed by the second byte for decoding the second byte into control signals;

a multiplexer coupled to the first and second ROMs for receiving the control signals from the first and second ROMs, wherein the multiplexer selects the decoded control signals from the second ROM in response to the first ROM control signal;

a bypass path coupled to the second receiving means so that a selected number of bits of the second byte bypass the second ROM; and wherein the bits which bypass the second ROM comprise a register address when the first ROM control signal is generated.

10. In a microprocessor of a type which decodes instruction words having at least first and second bytes, wherein the first and second bytes are ordinarily combined together to form a ROM address for addressing a ROM which decodes the instruction words, the instruction words being formed from a set of instructions which provide for operations wherein a portion of the second byte need not be decoded by the ROM, an apparatus for decoding the instruction words comprising:

first receiving means for receiving the first byte of the instruction words;

second receiving means for receiving the second byte of the instruction words;

a first ROM coupled to the first receiving means and being addressed by the first byte for decoding the first byte into control signals, the control signals including a first ROM control signal that is generated whenever the portion of the second byte of the instruction words needs to be decoded;

a second ROM coupled to the second byte receiving means and being independently addressed by the second byte for decoding the second byte into control signals;

a multiplexer coupled to the first and second ROMs for receiving the control signals from the first and second ROMs, wherein the multiplexer selects the decoded control signals from the second ROM in response to the first ROM control signal;

a bypass path coupled to the second receiving means so that a selected number of bits of the second byte bypass the second ROM; and a control block coupled to the bypass path and to the multiplexer for receiving the output of the multiplexer and the bits on the bypass path.

11. In a microprocessor of a type which decodes instruction words having at least first and second bytes, wherein the first and second bytes are ordinarily combined together to form a ROM address for addressing a ROM which decodes the instruction words, the instruction words being formed from a set of instructions which provide for operations wherein a portion of the second byte need not be decoded by the ROM, an apparatus for decoding the instruction words comprising:

first receiving means for receiving the first byte of the instruction words;

second receiving means for receiving the second byte of the instruction words;

a first ROM coupled to the first receiving means and being addressed by the first byte for decoding the first byte into control signals, the control signals including a first ROM control signal that is generated whenever the portion of the second byte of the instruction words needs to be decoded;

a second ROM coupled to the second byte receiving means and being independently addressed by the second byte for decoding the second byte into control signals;

a multiplexer coupled to the first and second ROMs for receiving the control signals from the first and second ROMs, wherein the multiplexer selects the decoded control signals from the second ROM in response to the first ROM control signal; and wherein the second ROM is addressed by a number of bits less than the number of bits comprising an entire second byte.

* * * * *